Figure 4:
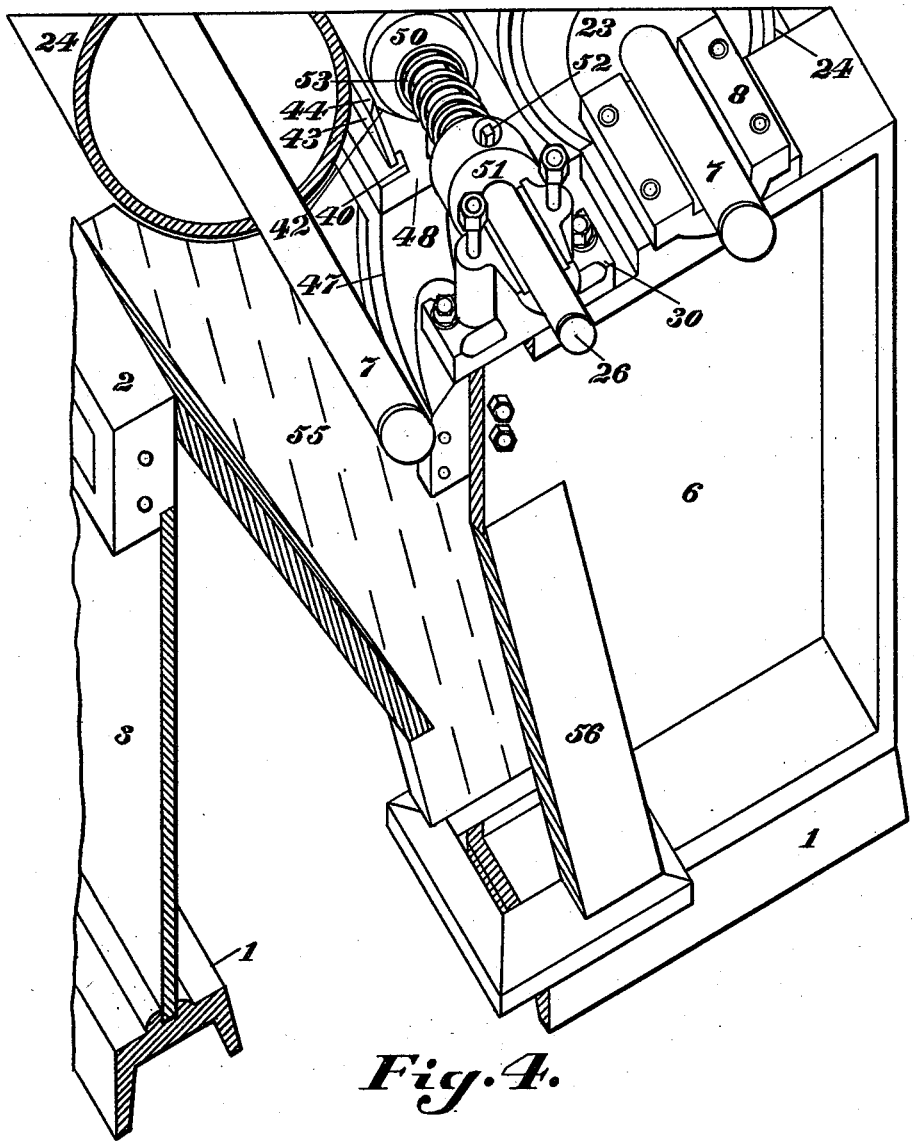

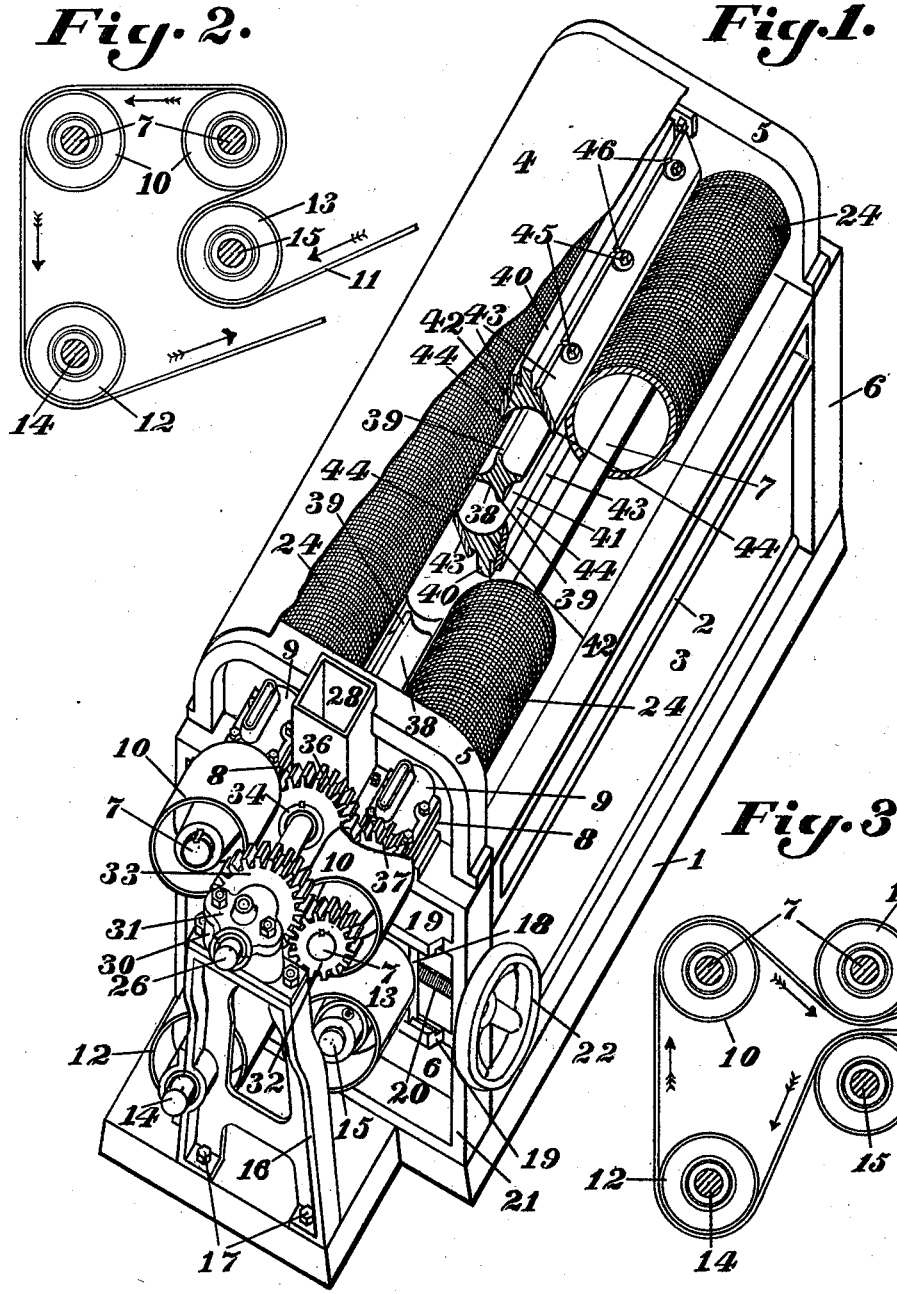
H. M. HAMMER.
DELINTING MACHINE.
APPLICATION FILED DEC. 27, 1910.
1,008,714.
Patented Nov. 14, 1911.
5 SHEETS—SHEET 1.
Witnesses:
William H. Brueseke.
Harry H. Peiss.
Inventor:
Henry M. Hammer,
By Hugh K. Wagner,
His Attorney.

H. M. HAMMER.
DELINTING MACHINE.
APPLICATION FILED DEC. 27, 1910.
1,008,714.
Patented Nov. 14, 1911.
5 SHEETS—SHEET 3.
Fig. 5.
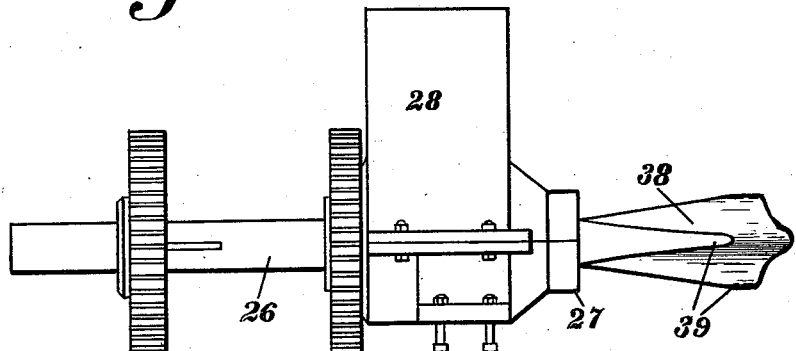
Fig. 6.
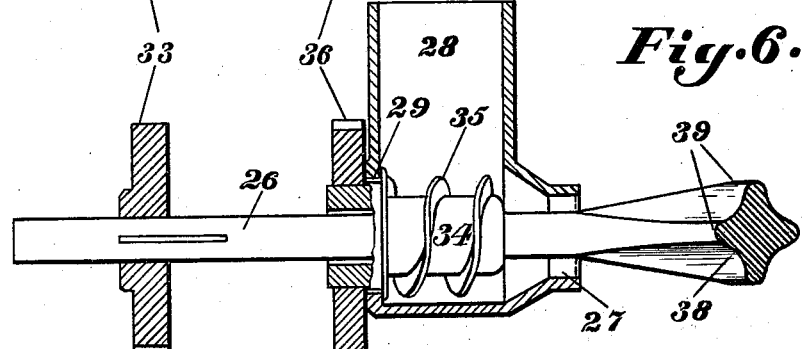
Fig. 8.
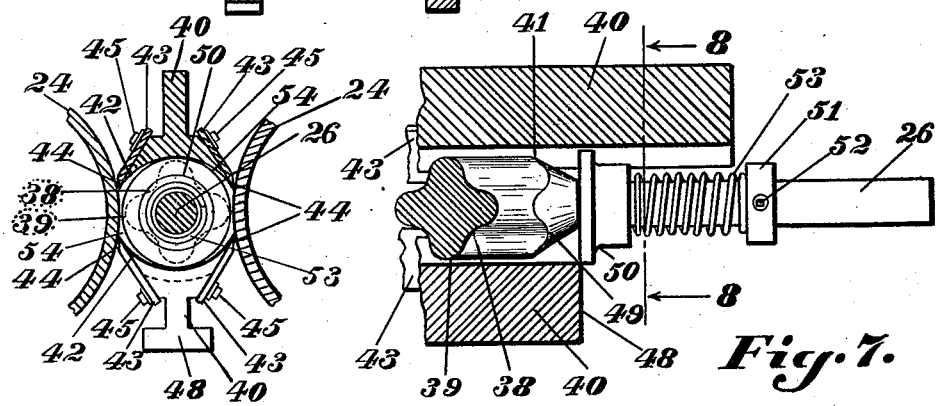
Fig. 7.
Witnesses:
William H. Brueseke.
Harry H. Peiss.
Inventor:
By Henry M. Hammer,
Hugh K. Wagner
His Attorney

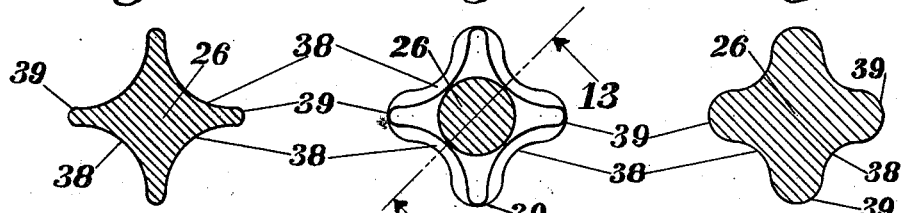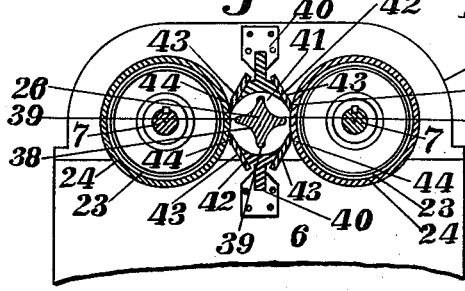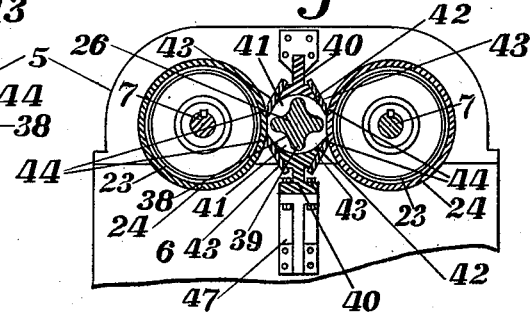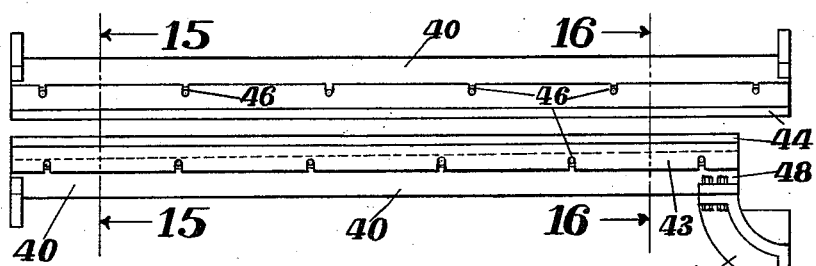

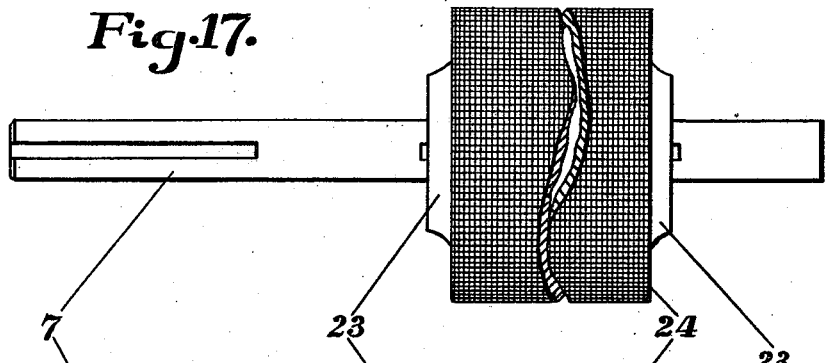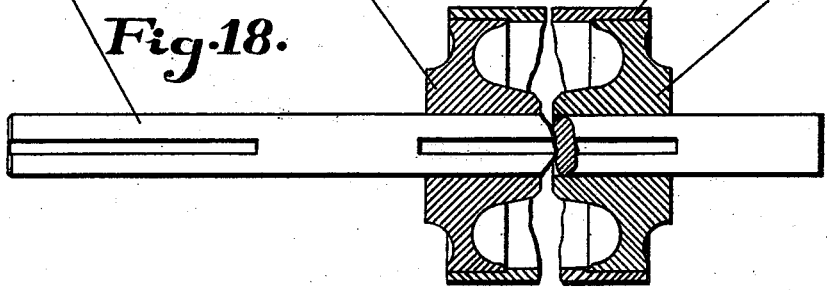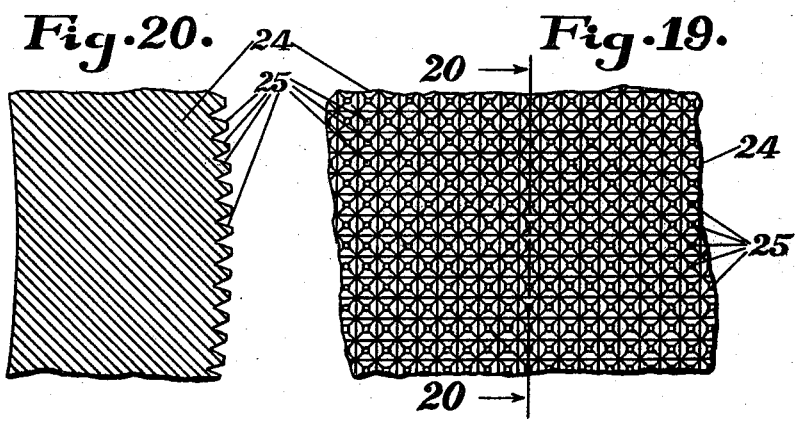

UNITED STATES PATENT OFFICE.

HENRY M. HAMMER, OF ST. LOUIS, MISSOURI.

DELINTING-MACHINE.

1,008,714. Specification of Letters Patent. Patented Nov. 14, 1911.

Application filed December 27, 1910. Serial No. 599,299.

*To all whom it may concern:*

Be it known that I, HENRY M. HAMMER, a citizen of the United States, residing at the city of St. Louis, State of Missouri, have invented certain new and useful Improvements in Delinting-Machines, of which the following is a specification.

This invention relates to cotton-seed delinters, and has for its object to provide a machine primarily intended for removing from cotton-seed all the fibers and lint which remain adhering thereto after the ginning operation, though capable, of course, of use for similar purposes in the treatment of objects other than cotton-seeds.

In the accompanying drawings forming part of this specification, in which like numbers of reference denote like parts wherever they occur, Figure 1 is a perspective view of the machine, a part of the cover therefor being broken away to expose some of the parts within the machine; Figs. 2 and 3 are diagrammatical views of the driving means; Fig. 4 is a fragmentary perspective view, on an enlarged scale, of the discharge end of the machine; Fig. 5 is a side elevation, on an enlarged scale, of the receiving hopper and part of the agitating shaft extending therethrough; Fig. 6 is a vertical sectional view of same; Fig. 7 is a side elevation, on an enlarged scale, of the discharge end of the agitating shaft; Fig. 8 is a sectional view on the line 8—8, Fig. 7; Fig. 9 is a side elevation of the agitating shaft; Fig. 10 is a sectional view, on an enlarged scale, on the line 10—10, Fig. 9; Fig. 11 is a sectional view, on an enlarged scale, on the line 11—11, Fig. 9; Fig. 12 is a sectional view, on an enlarged scale, on the line 12—12, Fig. 9; Fig. 13 is a sectional view, on a reduced scale, on the line 13—13, Fig. 11; Fig. 14 is a side elevation of the guides which form the seed-containing compartment; Fig. 15 is a sectional view on the line 15—15, Fig. 14; Fig. 16 is a sectional view on the line 16—16, Fig. 14; Fig. 17 is a side elevation, on an enlarged scale, of one of the delinting rollers; Fig. 18 is a longitudinal sectional view of same; Fig. 19 is an elevation, on an enlarged scale, of a portion of the periphery of a delinting roller; and Fig. 20 is a sectional view on the line 20—20, Fig. 19.

The base 1 supports the casing 2 which contains the delinting mechanism. In order to allow ready access to the interior of the machine, so that the operator can easily clean or repair same, either one or both of the side plates 3 of said casing may be removably held in place by any suitable means. A cover or hood 4 is arranged to close the top of the casing 2 and is supported by the end plates or castings 5, which are supported upon the ends 6 of said casing. A pair of shafts 7 extends from end to end of the machine and passes through openings in the end plates 5, being preferably disposed in a horizontal plane and arranged to extend substantially parallel to each other. Said shafts are journaled in pillow-blocks 8 and are held in place thereon by caps 9. Each shaft 7 projects beyond an end of the machine and bears a pulley 10 that is tightly mounted thereon. The pulleys 10 are driven by belt 11, which travels in engagement with the idle pulleys 12 and 13, mounted on shafts 14 and 15, respectively. The shaft 14 is supported by a standard 16 that is secured to base 1 by means of bolts 17 or the like. A block 18, which is supported by a pair of slides 19 borne by an end of casing 2, supports the shaft 15, and is arranged to be adjusted by means of a screw-threaded rod 20, so that the tension of belt 11 can be regulated, said rod passing through an opening in a flange or projection 21, borne by an end 6, and bearing a hand-wheel 22 for the purpose of turning same. The belt 11 may pass over both pulleys 10, as depicted in Fig. 2, in which case said pulleys will rotate in the same direction, or, if desired, said belt may pass over one pulley 10 and under the other, as shown in Fig. 3, so as to cause said pulleys to rotate in opposite directions.

Each shaft 7 bears a spider or spiders 23, upon which a delinting roller 24 having teeth or serrations 25 formed in its periphery is rigidly mounted, said spider or spiders being keyed or otherwise secured upon said shaft. The rollers 24 extend from one end plate 5 to the other and are spaced apart in order to allow an agitating shaft 26 to pass therebetween. The shaft 26 extends from end to end of the machine, and is preferably disposed in the same plane with and parallel to the shafts 7. One end of shaft 26 passes through the discharge spout or mouth 27 of a seed-hopper 28 and, also, through an opening 29 in a side of said hopper, and is journaled in a pillow-block 30 supported by standard 16, said pillow-block bearing a cap 31 to hold said shaft therein. The other end of shaft 26 extends through an opening in the end plate 5 at the discharge end of the machine, and is journaled in a similar pillow-block 30. A pinion 32 borne by a shaft 7 meshes with and drives gear 33 that is rigidly mounted on shaft 26. A sleeve 34 is loosely mounted on the shaft 26 within the seed-hopper 28 and bears a conveyer screw or blade 35, which not only feeds the seeds through the spout 27 into the machine, but causes same to travel toward the discharge end of the machine. Said sleeve extends through the opening 29 in hopper 28 and bears a gear 36, which is driven by pinion 37 rigidly mounted on a shaft 7.

The part of shaft 26 that is located within the machine is preferably larger diametrically than the ends of said shaft and is provided with flutes or furrows 38, which extend longitudinally thereof, each of said flutes or furrows being preferably inclined to the axis of said shaft in order to be shallower at the discharge end of the machine than at the receiving end and being separated from the adjacent flutes or furrows by fillets 39. The exterior diameter of the fillets 39, i. e., the largest diameter of shaft 26 is preferably uniform throughout the length of said fillets and is slightly smaller than the distance between the peripheries of rollers 24, so that same can rotate closely to, but not quite touching the teeth 25 of said rollers. A pair of supports 40 extends longitudinally between the rollers 24, one of said supports being located above the agitating shaft 26 and the discharge spout 27 of the seed-hopper 28, and the other being located beneath said shaft and said spout, in order to form a delinting chamber or passage 41 to receive the seeds that discharge from said spout, as hereinabove described. Each support 40 is provided with a transversely-concaved face 42, which extends the entire length thereof adjacent the shaft 26, and, also, with beveled sides to support a pair of blades or plates 43, said blades extending lengthwise of said support and converging from said shaft. Each blade 43 is so adjusted that its beveled edge 44 nearly touches the teeth 25 of a roller 24, in order to retain the seeds within the delinting chamber or passage 41, said beveled edge being preferably arranged parallel to the axis of said roller. Said blade can be moved toward or away from said roller by loosening the bolts 45, which pass through elongated notches or slots 46 in said blade and are screwed into tap-holes provided therefor in said support 40. As the teeth 25 of a roller 24 wear down from use, each blade 43 adjacent thereto is moved closer and closer toward said roller, being set so that the teeth 25, as said roller is revolved, will just fail to touch the beveled edge 44 of said blade, so as to prevent passage of the seeds between said blade and said roller.

The upper support 40 extends from end to end of the machine and is secured to the end plates 5 by any suitable means, said support being set so that its concaved face 42 extends substantially parallel to the axis of shaft 26 and nearly touches the fillets 39. The lower support 40 is preferably shorter than the upper support and extends from the receiving end of the machine to within a short distance of the discharge end of same. One end of said lower support is secured to the end 6 at the receiving end of the machine by any suitable means and the other end is fastened to a bracket 47 which is bolted or otherwise secured to the other end 6, part of the upper surface of said bracket being convex to prevent the seed that discharge from the delinting chamber 41 from accumulating thereon. The concaved surface 42 of the lower support 40 inclines to the axis of shaft 26 and slopes downwardly from the discharge end of the machine to the receiving end thereof, being set closely to, but not touching the fillets 39. By this arrangement and the fact that the flutes or furrows 38 are shallower at the discharge end of the machine than at the receiving end of same, the capacity of the delinting chamber or passage 41 gradually decreases toward the discharge end of the machine, in order to prevent the seeds from traveling too rapidly toward the discharge end of chamber 41 and, also, to compensate for the difference in size of the linted and delinted seeds, for the reason that the seeds obviously take up less room after same are delinted in traveling toward the discharge end of said delinting chamber in the manner hereinabove described.

The shaft 26 is reduced adjacent the receiving end of the delinting chamber 41, so that the fillets taper toward the discharge spout 27 of seed-hopper 28, in order to allow the seed to discharge readily from said spout into said chamber. The fillets 39 terminate adjacent the discharge end 48 of the lower support 40, at which point the shaft 26 is tapered or reduced at 49 to limit the movement of the valve or collar 50 toward the end 48 of said support, said valve or collar being reciprocatively mounted on the turned portion of said shaft that is adjacent said taper. A collar 51 is fastened on shaft 26 by means of a set-screw 52, or the like, and forms a stop for a spring 53, which holds the valve or collar 50 normally in engagement with the taper 49 of shaft 26.

At the end 48 of the lower support 40 the distance between the centers of the concaved faces 42 is substantially equal to the distance between the peripheries of rollers 24. The periphery of valve 50 is approximately tangent to the concaved faces 42 of the supports 40 and, also, to the peripheries of rollers 24, and the face of said valve registers in the plane of the end 48 of the lower support 40, in order to close the discharge end of the delinting chamber or passage 41.

As the conveyer screw 35 feeds the seeds into the delinting chamber 41, same travel toward the valve 50 and press against said valve. The valve 50 retains the seeds in the chamber 41 until the pressure of the seeds against the valve becomes greater than the resistance of spring 53, at which time said valve is automatically forced away from the end 48 of the lower support 40 so as to allow the delinted seeds adjacent thereto to escape from the discharge end of said chamber. This retention of the seeds in the delinting chamber 41 is necessary, in order to allow the agitation caused by the fillets 39 of the agitating shaft 26 to subject the seeds under pressure to the action of the teeth 25 of the delinting rollers 24, because, without such retention, the seeds would merely hop around within said chamber and not come in contact with said teeth with sufficient pressure to be delinted. After a sufficient amount of delinted seeds discharge from the delinting chamber 41, so that the pressure of the seeds becomes less than the pressure of spring 53, the latter causes the valve 50 to close the discharge end of said chamber automatically, whereby the seeds are retained in said chamber until the pressure within said chamber again increases sufficiently to force the valve 50 away from the discharge end of said chamber. As the radius of the valve 50 is preferably smaller than the radius of either concaved face 42, relatively small spaces 54 are left between the periphery of said valve and the peripheries of rollers 24. Obviously, some of the delinted seeds escape through the spaces 54, but as this number is comparatively small, this escapement has no appreciable effect upon the automatic operation of the valve 50, as hereinabove described.

The delinted seeds that escape from the delinting chamber 41, as hereinabove described, fall upon a chute or incline 55 which discharges same into a spout 56. Said spout projects through an opening in an end 6 of casing 2 and delivers the seeds to any suitable conveyer or receptacle (not shown).

The operation of the machine is as follows: Power from any suitable source being applied to belt 11, the pulleys 10 and shafts 7 are caused to rotate, with the result that the pinions 32 and 37 drive shaft 26 and sleeve 34 through the intermediation of gears 33 and 36, respectively. The seeds to be delinted are fed into the hopper 28 and are then forced by the pressure of screw 35 to pass through the spout 27 into the delinting chamber 41 and to travel toward the valve 50. The fillets 39 of the shaft 26 agitate the seeds within the delinting chamber 41 and cause same repeatedly to contact the teeth 25 of the delinting rollers 24. The teeth 25 of said rollers churn or agitate the seeds within the flutes or furrows 38 and thereby come in contact with all of the seeds within the delinting chamber 41, so as to remove the short fibers or lint from the seeds. The sloping face 42 of the lower support 40 in conjunction with the tapering flutes 38 compensate for the difference in size of the linted and delinted seed and prevent the seeds from traveling too rapidly through the delinting chamber 41. This arrangement causes each seed to be presented frequently to the teeth 25 of both rollers 24. While the seeds are fed through the delinting chamber, same press against the valve 50 until the pressure becomes sufficient to overcome the resistance of spring 53, at which time the valve opens the discharge end of said chamber and allows the delinted seeds adjacent thereto to escape and to fall upon the chute 55 which delivers them to the spout 56. After the pressure of the seeds within the delinting chamber becomes less than the pressure of spring 53, the valve 50 closes the discharge end of said chamber, whereby the seeds are retained in said chamber until the valve is again forced to open the discharge end of said chamber. The lint or fiber scraped off the seeds drops into the bottom of casing 2, and, when necessary, a side plate 3 is removed in order to allow the operator to remove the lint from said casing, or, if desired, any suitable conveyer or suction-fan may be provided for the purpose of disposing of the lint.

I claim:

1. In a delinting machine, the combination of a pair of delinting drums, a delinting passage therebetween, and a fluted agitating shaft revoluble in said passage, the flutes in said shaft being shallower at the discharge end of said passage than at the receiving end thereof.

2. In a delinting machine, the combination of a pair of delinting drums, a delinting passage therebetween and being smaller at its discharge end than at its receiving end, and a fluted agitating shaft revoluble in said passage the flutes in said shaft being shallower at the discharge end of said passage than at the receiving end thereof.

3. A delinting machine including a pair of delinting drums arranged side by side in spaced relation, a longitudinal member extending in the space between said drums at points below the longitudinal axes of said drums, a second longitudinal member extending in the space between said drums at points above the longitudinal axes of said drums, the inner sides of said drums forming the sides of a delinting passage the top and bottom of which latter are formed by said longitudinal members, and agitating means in said passage.

4. A delinting machine including a pair of delinting drums arranged side by side in spaced relation, a longitudinal member extending in the space between said drums at points below the longitudinal axes of said drums, a second longitudinal member extending in the space between said drums at points above the longitudinal axes of said drums, the inner sides of said drums forming the sides of a delinting passage the top and bottom of which latter are formed by said longitudinal members, each of said longitudinal members having their sides beveled and converging toward the outer side faces of said members, a blade, secured to each beveled side of each member and having its inner edge disposed in close proximity to the periphery of the adjacent drum, and agitating means in said passage.

5. A delinting machine including a pair of delinting drums arranged side by side in spaced relation, a member arranged in said space between the drums and extending below the longitudinal axes thereof, a second member arranged in the space between the drums and extending above the longitudinal axes thereof, a blade carried by each side of each member and arranged to have its edge in juxtaposition to the periphery of the adjacent drum, said members and their blades and the inner faces of the drums between the members coöperating to form a delinting passage, and agitating means in said passage.

6. In a delinting machine, a pair of spaced delinting drums, means above and means below the space between said drums to form the top and bottom respectively of a delinting passage the sides of which passage are formed by the inner sides of said drums, and agitating means in said passage.

7. In a delinting machine, a pair of spaced delinting drums, means above and means below the space between said drums to form the top and bottom respectively of a delinting passage the sides of which passage are formed by the inner sides of said drums, a seed hopper closing one end of said passage and having a discharge spout which projects in said passage, a conveyer in said hopper to feed the seed into said passage, agitating means in the passage, and means to actuate the conveyer and the agitating means.

8. In a delinting machine, a pair of spaced delinting drums, means above and means below the space between said drums to form the top and bottom respectively of a delinting passage the sides of which passage are formed by the inner sides of said drums, a seed hopper closing one end of said passage and having a discharge spout which projects in said passage, a shaft in said passage having one end thereof extending through the hopper discharge spout, said shaft having agitating means thereon which extend in said passage and further having a conveyer thereon which latter is located in the hopper, and means to rotate said shaft.

9. In a delinting machine, a single pair of spaced delinting drums arranged in spaced parallel relation, and a pair of oppositely disposed members arranged in the space between the drums and forming the top and bottom of a delinting passage the sides of which latter are formed by the inner side faces of said drums.

10. In a delinting machine, a single pair of spaced delinting drums arranged in spaced parallel relation, and a pair of oppositely disposed members arranged in the space between the drums and forming the top and bottom of a delinting passage the sides of which latter are formed by the inner side faces of said drums, and an adjustable blade carried by each side of each of said members.

11. In a delinting machine, a pair of spaced drums, a pair of spaced members arranged on opposite sides of the longitudinal axes of the drums in the space between the latter, and lint-detaching means carried by the members and being inwardly adjustable to form two of the walls of a delinting passage, the other two walls of which are formed by said drums.

12. In a delinting machine, a pair of spaced drums, a pair of spaced members arranged on opposite sides of the longitudinal axes of the drums in the space between the latter, and a blade carried by each side of each member, said blades being adjustable inwardly and forming two of the walls of a delinting passage, the other two walls of which are formed by said drums.

13. In a delinting machine, spaced delinting drums, members between said drums to form a delinting passage in conjunction therewith, agitating means in said passage, and lint-detaching means carried by said members to coöperate with the drums and the members to form said passage, said means being adjustable inwardly toward the agitating means.

14. In a delinting machine, a pair of spaced drums, a pair of spaced members arranged on opposite sides of the longitudinal axes of the drums in the space between the latter, means carried by the members to form two of the walls of a delinting passage, the other two walls of which passage are formed by said drums, and a movable valve closing one end of said passage and shaped to conform to the contour of said passage.

15. In a delinting machine, a pair of spaced drums whose confronting faces form two of the walls of a delinting passage, means in the space between the drum and on opposite sides of the longitudinal axes of the drums to form the other two walls of said delinting passage, and displaceable closure means at one end of said passage conforming to the contour thereof.

In testimony whereof I hereunto affix my signature in the presence of two witnesses.

HENRY M. HAMMER.

Witnesses:
GEORGE G. ANDERSON,
GLADYS WALTON.

Copies of this patent may be obtained for five cents each, by addressing the "Commissioner of Patents, Washington, D. C."